United States Patent

[11] 3,620,624

[72] Inventor: John J. Van Acker, Chesterland, Ohio
[21] Appl. No.: 858,343
[22] Filed: Sept. 16, 1969
[45] Patented: Nov. 16, 1971
[73] Assignee: Addressograph-Multigraph Corporation, Cleveland, Ohio

[54] WORK ARRANGING SYSTEM
8 Claims, 8 Drawing Figs.

[52] U.S. Cl. .................................. 355/61, 355/74
[51] Int. Cl. .................................. G03b 27/58
[50] Field of Search .................... 355/18, 43, 51, 59–63, 65, 66, 74

[56] References Cited
UNITED STATES PATENTS

| | | | |
|---|---|---|---|
| 1,743,310 | 1/1930 | Beidler | 355/61 X |
| 2,927,503 | 3/1960 | Zollinger | 355/62 X |
| 3,295,408 | 1/1967 | Rab | 355/61 X |

Primary Examiner—Samuel S. Matthews
Assistant Examiner—Richard A. Wintercorn
Attorneys—Russell L. Root and Ray S. Pyle ABSTRACT: An autofocus camera with mechanical advancement and processing of photosensitive copy whereby the operator is unable to view the location of the image on the copy. A copyboard is marked with indicia and calibration scales for accurate placement of the image on the copy sheet.

PATENTED NOV 16 1971 3,620,624

JOHN J. VANACKER
INVENTOR
BY Ray S Pyle
ATTORNEY

JOHN J. VANACKER
INVENTOR
BY Ray S Pyle
ATTORNEY

3,620,624

WORK ARRANGING SYSTEM

BACKGROUND OF THE INVENTION

Process camera work is normally accomplished by apparatus which is simply an enlarged and more sophisticated version of the ordinary snapshot camera. The image is projected onto a focusing surface and brought to the size and position with respect to that surface as desired. Then, an unexposed sheet of film is placed in the carrier and exposed to produce the desired image.

With the advent of a master-making machine for production work, set forth in U.S. application Ser. No. 627,757, the photosensitive sheet is conducted to an image plane and exposed without the operator of the machine being able to observe the positioning of the sheet or its exposure.

Prior machines have provided optical center markings for original material positioning on a copyboard. The original material is placed on the board centered on the optical center. Then markings on the board surface indicate the degree of enlargement or reduction needed to fit the image on the available photosensitive surface.

A master prepared in such a device will have the image positioned at the top margin of the master only if the original material is of one specific proper size. If the original material size, or the changed in image size, causes the image to fall short of the master top limit, then the printing machine must be adjusted to fit the image. That is, the master cylinder and paper feed must be adjusted to match the paper impression position to image location.

DEFINITION

For convenience of description, the material to be copied will be referred to by the generally accepted term of art "original material" or just "original." A projected image may be viewed, but not retained as a permanent record. Therefore, a developed photosensitive sheet made from that image is a "hard copy" of the image. The machine of U.S. application for Letters Patent, Ser. No. 627,757, is promoted as a master-making device for electrostatic lithographic masters. This invention was created to serve that machine as its original purpose. Therefore, the "hard copy" will be referred to as a master throughout this description. Other uses will be apparent.

SUMMARY OF THE INVENTION

This invention is based upon first establishing an optical center on the copyboard of the machine, which center never varies as an autofocus structure changes size of the image. Then, the original material can be placed with respect to the optical center around the optical center. The limits of enlargement or reduction which might be desired are then calculated, and the focus of the camera changed to produce this desired result on the photosensitive sheet.

An advantage of this invention is that process camera work may be done by composing original material in a normally illuminated area, and then correctly positioned in a selected size ratio onto a photosensitive surface which is positioned by apparatus within an enclosure out of operator view.

An object of this invention is to calibrate a coordinate system of optical system and copyboard with respect to a specific size and form of lithographic master such that original material placed on the copyboard will be correctly positioned on the master, hidden within the process camera, leaving proper lead edges for the lithography printing press clamps, and correctly placing the original material with respect to the lithographic machine paper gripping and side guiding devices. The advantage is that the image will be so positioned, from one master to the other, during various reductions or enlargements so as to make unnecessary consequent paper gripping and side guiding adjustments on the lithographic, or any other type of duplicating, machine.

Another object of the invention is to provide indicia devices which produce relative enlargement and reduction indicia in a manner which enables the sequential exposure of the same photosensitive sheet under differing enlargement and reduction conditions in order to place random size original material in proper proportion and position upon a photosensitive sheet. The advantage is that conventional camera work film developing-drying, and stripping operations are eliminated.

DESCRIPTION OF THE PREFERRED EMBODIMENT

Figure 1:
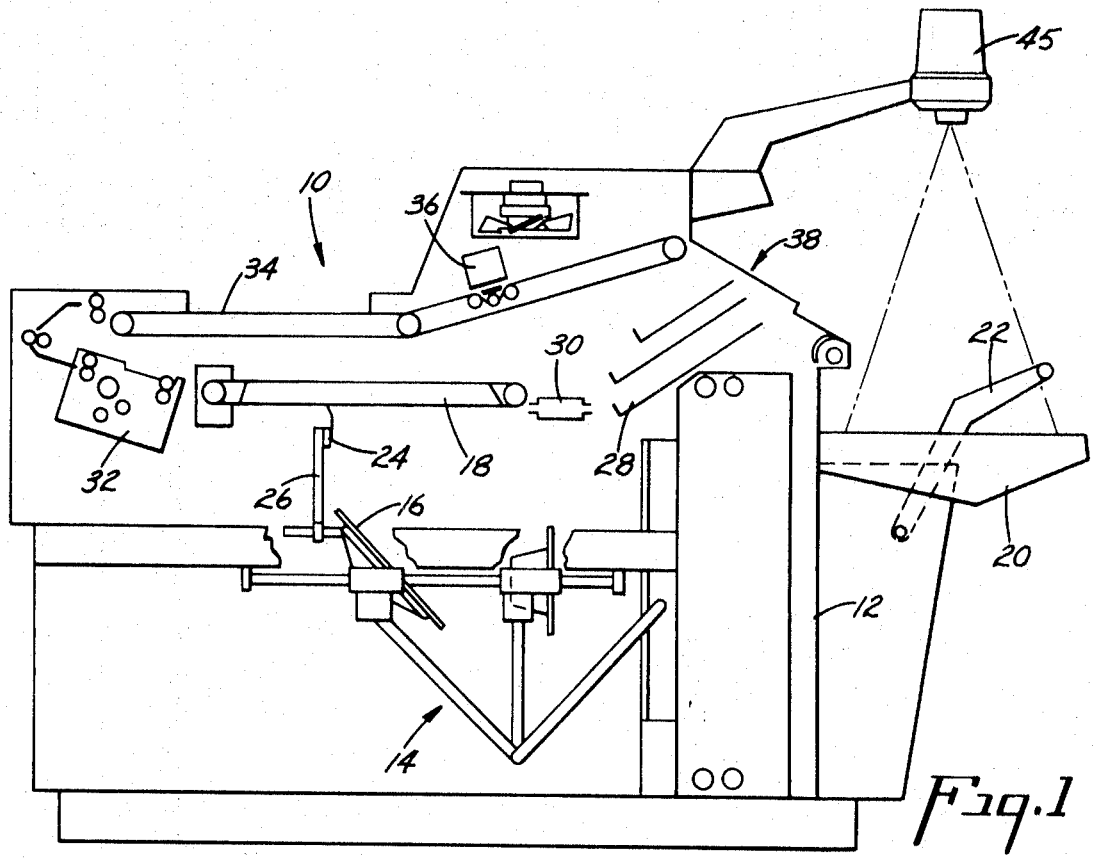
FIG. 1 is a side elevation of a machine having a copyboard incorporating the principles of this invention, with a sidewall of the machine removed to reveal interior components.

FIG. 1 is essentially a reproduction of the FIG. 1 of U.S. application Ser. No. 627,757, with the addition of a projector lamp house, and hence will be described only in brief outline.

The machine is essentially a small, self-contained darkroom with processing equipment controlled from the exterior. The reference numeral 10 refers to the housing portion in general. The housing has a glass plate 12 which serves as the object plane for an autofocus apparatus 14. Autofocus 14 consists essentially of three levers arranged in a Peaucellier principle. A mirror 16 is used to direct the image upwardly to the lower plane surface of a vacuum belt conveyor 18. The advantage of a mirror instead of a vertical image plane is in the accomplishment of reduced cabinet size for the housing 10 and ability to move the electrostatic masters through a convenient path.

A copyboard 20, of the type and suspension as taught in U.S. application Ser. No. 651,733, has a horizontal position as shown in Figure 1 in order that the original material may be properly arranged with operator convenience. Then, the surface of the copyboard 20 is rotated downwardly to press in firm contact with the glass which forms the object plane 12 of the autofocus 14. A manual operating lever 22 provides the operating power. This invention is directed to the manner of determining where to place the original material on the surface of the copyboard 20 in order to cause the original material to be properly positioned on the master held by the conveyor 18, and to permit the multiple exposure of various pieces of original material, some of which may be of a size not capable of being projected at the same ratio of size as the balance of the original material.

A switch 24 is carried on a standard 26 which is in turn mounted upon the mirror 16 but is shiftable with respect to its relative position upon the mirror. The switch 24 is in control of the drive operating the conveyor 18. Whenever a master strikes the switch 24 the conveyor is brought to a halt and thus the master is held in the position determined by the switch 24. For short masters, an exterior control (not shown) causes the standard 26 to move close to the mirror 16. For longer masters, the control is actuated to move the standard 26 farther away from the mirror. Hence, the masters are all centered on the optical center of the optical system regardless of their overall length, within the limits designed into the machine.

A supply of masters is placed in a hopper 28 and is fed upon demand through a charger 30 to the vacuum conveyor 18. Thus, the master is electrically charged just prior to being exposed. After an exposure is completed, the switch 24 is rendered inoperative Land the master is caused to be conveyed to a toner station 32 and then through suitable guides to a conveyor 34 and a fuser 36. The completed fused master is then delivered up to a station 38 where the operator is able to obtain the finished product.

Figure 2:
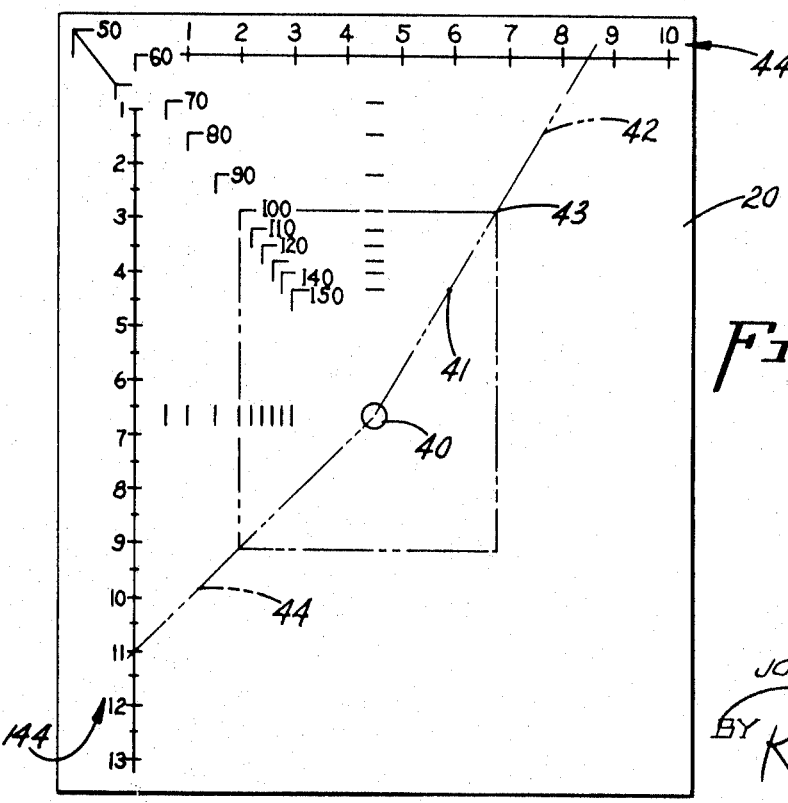
FIG. 2 is a plan view of the copyboard of FIG. 1 showing indicia markings on the face of the board placed in accordance with this invention.

Referring now to FIG. 2, which is a plan view of the face of the copyboard, the fundamental concept of the relationship in placement of original material on the board will be explained. At all times, it must be kept in mind that original material, if it is not the exact size desired for the master, must be enlarged or reduced. Whenever the optical system is caused to project an image of a size which differs from the size of the original material, if the image cannot be viewed before exposure is to be made, then its location must be otherwise determined. The preferred embodiment of the invention, as illustrated, causes the autofocus device to operate on a fixed optical center, which center is indicated by the small circle 40, shown on Figure 2.

The plurality of corner markings radiating along a center line from the center 40, and marked with numbers ranging from 150 to 50, represent arbitrary uniform corner marks for convenience. As an example, if the hard copy is of a size which will require a 150 percent increase in size in order to be placed on an 8½×11 master, then if that original material were plotted on the copyboard in the position it must assume in order to be enlarged and properly projected on the master, it will be found that the top edge of the original material will lie with its corner in the corner marking indicated by numeral "150" and its right edge will lie on a point 41.

Then, a line drawn from optical center 40 through the point 41 is a reference line which will be found to be common to all size projections. That is, assume that the original material is exactly the correct size, for example, and that its upper left-hand corner is placed in the corner marking "100." Then, the right-hand corner of that sheet will be found to lie on the line 42 at a point 43. The line 42 may then be projected to any convenient border area and a scale 44 of markings produced to aid in future placement of original material. The scale is arbitrary in absolute size, being larger the farther it recedes from the center 40. However, there is no required distance relationship with respect to the line 42. It is placed on the border as indicated in FIG. 2 solely for the purpose of convenience to get that scale out of the working area and make it accessible for operator use.

Further, the line 42 is preferably only an imaginary line, being actually provided by a temporary straight edge tool. The tool is then placed from the center to the point on the scale which indicates the desired margin. It may be desired to confine the image to a 6-inch width, for example, in order to fit a desired print size, even though the master would accept a wider print sheet.

As a further explanation, if a master image of a size to print out on an 8½ inch page is required, then regardless of the master width, the line 42 will establish the proper position for the upper right-hand corner of a rectangular area in which the original material must fall. Then, the original material is moved upwardly until its top edge fits within one of the magnification marks and the line 42. The image ratio is then established to that size, and the image will be placed to the left and top margin limits of the master, and within the right-hand size limit.

Likewise, a scale 144 on the left margin of the board is used to indicate length limitations. A line 44 which extends from the center 40 to the scale 144 delineates all copy which may be located within the length limits. The line 44 is chosen to illustrate the selection of a line indicating the border for paper 11 inches long. At any given magnification requirement, whether it is one-to-one projection as the "100" mark suggests in the phantom copy on Figure 2, or whether it is either larger or smaller, the copy may not exceed in length the position which will place its lower corner below the line 44. If it does extend below the line, that portion below a line lateral to the intersection point will not be projected onto a master for duplication on an 8½ inch × 11 inch sheet.

If a longer master is located in the machine, for example if a 12-inch or 14-inch master is employed, then the line 44 is simply moved down the scale to that dimension indicia, and original material which has a corner intersecting at or above the line will be reproduced on the longer master.

The relationship of the series of corner marks is that which may be calculated or empirically discovered, and represents the size of an object which may be projected at a given percentage of enlargement or reduction upon a selected master.

The permanent markings shown in FIG. 2 must be a color which will not be reproducible on the electrostatic master. Otherwise, the margin markings outside the original material would be reproduced on the edges of the master where markings are not to be made. Certain colors do not reflect a wave length of light which will discharge an electrostatic master. Furthermore, pigments which are substantially invisible to white light are available which will fluoresce under ultraviolet light. Then the board may be irradiated by ultraviolet light while composition is taking place, and the light removed during actual exposure.

Figure 4:
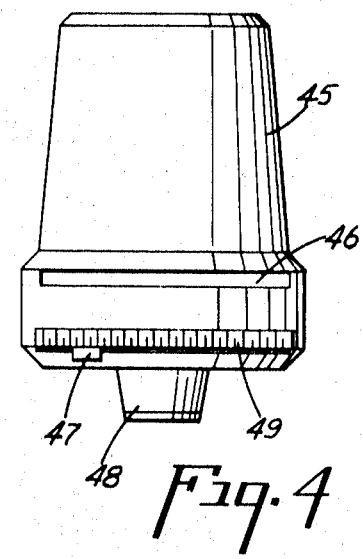
FIG. 4 is a front view of the projection head only shown in Figure 1, showing a slot for insertion of a film transparency, and an adjustable projection lens.

However, the markings shown in FIG. 2 have certain limitations in that the sizes indicated are in arbitrarily chosen increments, and any original material that falls between those increments requires operator skill in interpolation. Accordingly, an alternate system of providing correct locating marks operates by means of an overhead projector 45. See FIG. 4. Projector 45 may employ a series of different slide transparencies, each representing one of the arbitrary size markings on the FIG. 2, or a single transparency may be employed and the projector equipped with a lens of changeable focal length. The projector shown in FIG. 4 provides for either use. An opening 46 is provided to receive a transparency in the position normal for photographic projectors. If the projector is to be employed with a series of fixed size transparencies, then no change of focal length of the lens is needed. However, for a single size transparency, a handle 47 is provided to operate a conventional lens 48 which enables shortening and lengthening of the focal length for projection through a series of sizes. Then, a scale 49 is provided adjacent to the handle 47 to indicate the ratio of enlargement or reduction to which the autofocus system 14 must be set in order to bring the particular original material within the limits of the selected master size. The image projected by the projector 45 is employed precisely in the manner described with respect to the fixed scale in FIG. 2.

Figure 3:
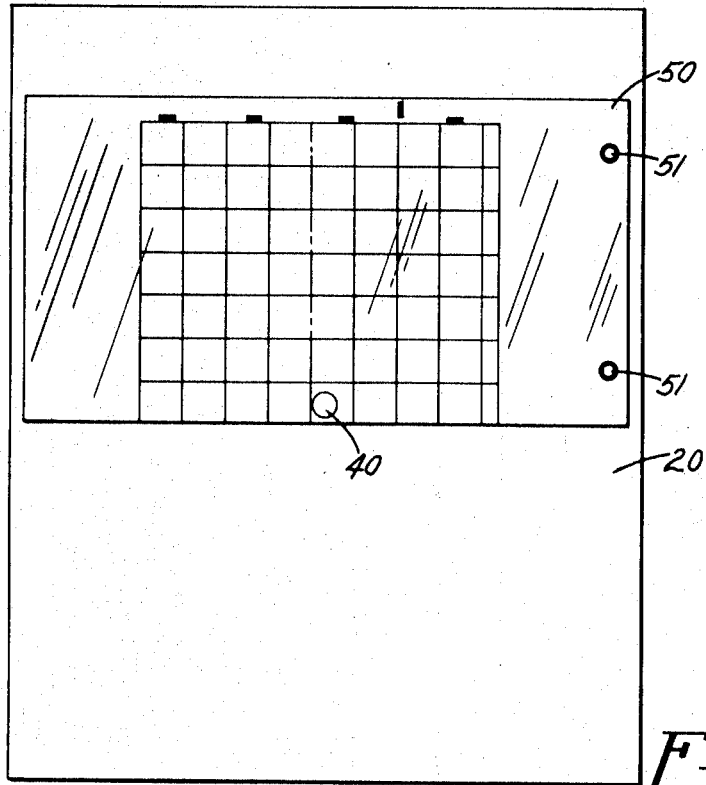
FIG. 3 illustrates the provision of relevant markings by means of a substituted transparent sheet.

Another system for providing an alternate to the plurality of individual marks is shown in FIG. 3. A transparent sheet 50 is positioned over the face of the copyboard by means of two pins 51 which cooperate with guide holes in the sheet 50. The sheet 50 is also altered in that a full grid is provided which represents 1-inch square modules or other convenient measuring system, on the projected image whenever the autofocus system 14 is properly adjusted. One sheet 50 is provided for each magnification size desired. The sheets may be about half the original material size, for ease in the positioning of original material. The operator lifts one edge of the sheet, and by holding the lower portion of the original material, is able to move the copy until it registers under the sheet in its proper location. Any number of such magnification sheets are possible, but a range from 50 percent reduction to 150 percent magnification, as shown in Figure 2, is a practical range.

The sheets 50 are employed somewhat differently than the permanent markings of FIG. 2 in that the original material is placed under the transparent sheet and thus the markings are not blocked out from the operator's view. This same advantage is obtained in the projection of the pattern by projector 45. The use of the grid has the advantage of enabling the operator to visualize the precise location and relationship of the original material to other original material because the entire grid work is available in the exact size relationship which will ultimately be reproduced on the master.

After the original material has been properly positioned under the sheet 50, then the sheet is removed and the original material is adhered to the surface of the copyboard in proper location. Then, there is no concern with respect to the possible projection of locating grid patterns of the master.

Figure 5:
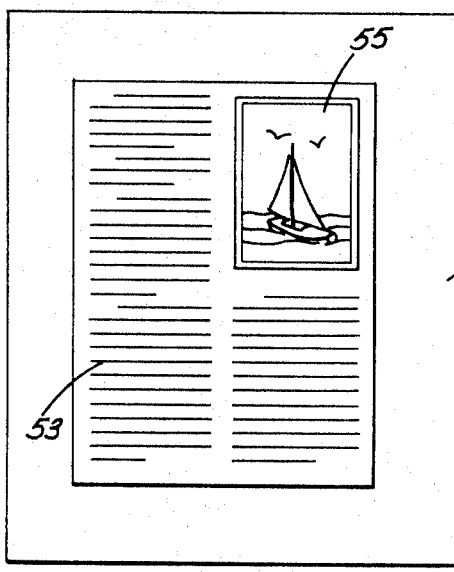
FIG. 5 illustrates a hypothetical desired electrostatic master.
Figure 6:
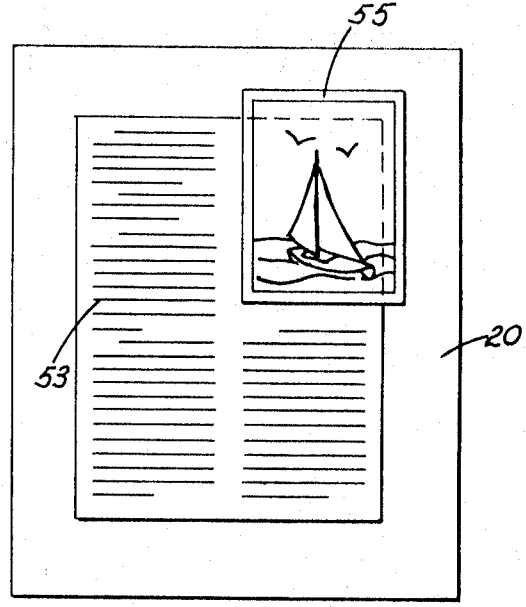
FIG. 6 illustrates a hypothetical original material in the form of a correctly sized page of script and an oversized picture.

In order to illustrate the use of this invention in direct composition, a series of illustrations 5 through 8 show a possible practical problem. FIG. 5 illustrates a desired page of script 53 and a picture 55. The script 53 in this particular illustration is the correct desired size and needs no enlargement or reduction. However, as shown in FIG. 6, the picture 55 is much too large for the available space on the master, if projected to one-to-one relationship.

Figure 7:
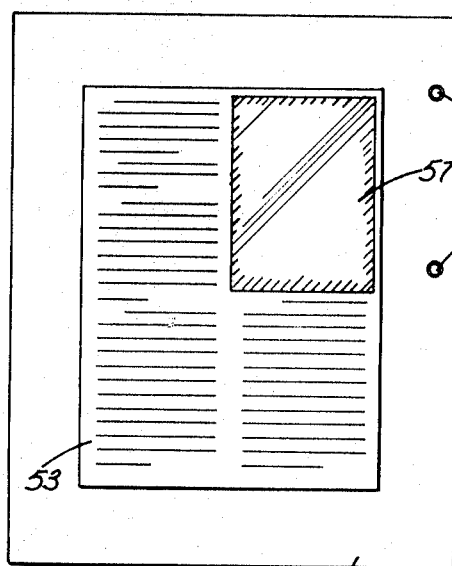
FIG. 7 illustrates a copyboard with the correctly sized page of script in place for exposure.
Figure 8:
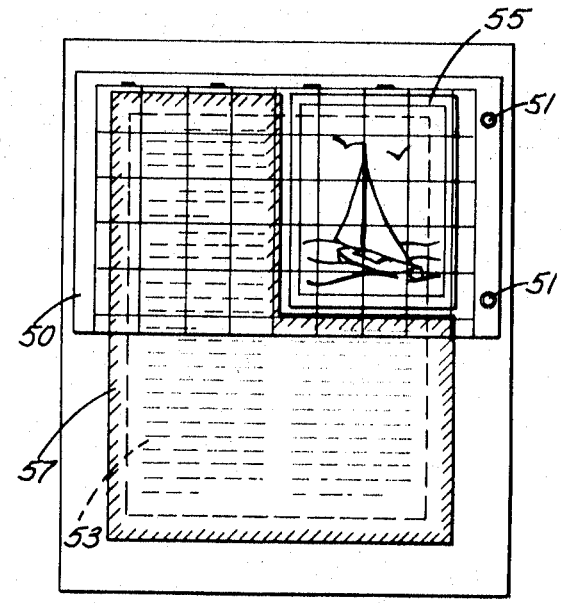
FIG. 8 illustrates the use of a substituted transparent sheet with position and size markings dictating the location and amount of reduction in size for the picture to be placed in the appropriate reserve space of the FIG. 7 exposure.

In FIG. 7 the text script 53 is placed in position by any of the three described methods. A black sheet of paper 57 is placed in the corner reserved for the picture shown in the FIG. 6. (The black paper being illustrated by a series of short angular lines surrounding its perimeter.) The exact number of inches in that corner spacing may be read directly from grid work on the sheet 50, or from the projector 45.

Then, the text script 53 is projected onto a master with the black paper 57 reserving a corner which will not be photographically sensed, and therefore will not discharge the electrostatic charge in that area of the master.

The conveyor system 18 is caused to remain in position after the exposure in contradistinction to the prior application structure wherein the electrical system is programmed to cause the master to move out to the toning station immediately after exposure. Because such retention in position is well within the skill of the ordinary electrical engineer, no wiring diagram is believed necessary to illustrate this holding feature for the machine.

After the exposure of the script 53, the picture 55 is compared to various size sheets 50, or measured by the projection of the transparency, until one is found which will contain the picture within the number of grid spaces which represents the reserved number of inches on the master. Then, the selected sheet is placed on the copyboard with the picture 55 in proper position such that setting the autofocus to the amount of reduction which will bring the picture 55 into the size of the reserved spot on the master. Note that black paper 57 is then required to cover the area which represents the position of the script 53, if the script were in fact as large in proportion as the picture. The area is proportional to the size of the picture, because reduction of everything on the face of the copyboard indicates that the black paper will also be reduced. Hence, the black paper must be of a large size in order that when the autofocus projects a reduced size of the black paper, that reduced size will be equal to the previously exposed script 53 area and not smaller.

After the black paper and picture 55 are properly located, then the sheet 50 is removed and exposure made in the normal manner. The picture 55 will then be reduced and will properly positioned in the reserved area of the master. The master is then caused to be conveyed to the toner area and fixed in the manner prescribed in order to produce a useful electrostatic master for a lithography machine.

What is claimed is:

1. A cooperative system for exposing original material onto a photosensitive master sheet, having positional markings for proper placement of image thereon comprising:
   a holder surface for a photosensitive sheet;
   a copyboard for acceptance of work to be photocopied;
   an optical system for focusing the copyboard surface onto the holder surface, said optical system having a known fixed optical center located on the holder surface and copyboard surface;
   means for focusing the optical systems by moving the relative positions of the holder surface, copyboard surface, and lens to produce a range of projected image sizes on said holder;
   means for transporting a photosensitive sheet into a predetermined position relative to said optical center; and
   a plurality of gauge indicia markings on said copyboard related to said optical centers and sheet position such that the distance from a selected mark to the copyboard optical center point is related to the setting of the lens for one selected magnification ratio such that the selected mark on the copyboard indicates a positional relationship of the original material to place the image in registration with the said positional markings of the master print area.

2. A system for projecting an image of original material upon a photosensitive sheet, comprising:
   a copyboard surface for positioning of original material;
   an optical system for projecting an image of the copyboard surface and its burden;
   means for focusing said systems to produce any desired size ratio of image to original material within a range;
   means for selecting a photosensitive sheet and transporting the sheet into registration with the location of said focused image;
   said optical system having an optical center said center intersecting said copyboard at one substantially fixed point throughout said range; and
   size-positioning calibration markings on said copyboard surface indicating a series of discreet maximum boundaries markings in which original material must be confined for projection at an indicated size ratio to produce an image area of a selected standard size; and
   a scale across said copyboard calibrated with reference to said optical center point such that a line from the center point to a point on the scale which represents the maximum image area of the photosensitive sheet indicates a lateral maximum position of original material that will be projected onto the sheet at the indicated projection ratio.

3. A machine for making masters of a preselected size for lithographic printing from original material not necessarily of the desired preselected size comprising:
   a closed housing of sufficient darkness for processing photosensitive master sheets;
   a copyboard system for positioning of original material;
   an optical system for projecting an image of the copyboard surface and its burden;
   means for focusing said system to produce a desired size ratio of image to original material within a range;
   means for selecting a photosensitive sheet and transporting the sheet into registration with the location of said focused image;
   said optical system having an optical center, said center intersecting said copyboard at one substantially fixed point throughout said range; and
   size-positioning calibration markings on said copyboard surface indicating a series of discreet maximum boundary markings in which original material must be confined for projection at an indicated size ratio to produce an image area of a selected standard size, said boundary markings radiating from said optical center and including a one-to-one position and a series of positions other than one to one;
   said boundary markings providing a positional relationship for original material of any size rectangular field with a top edge such that with said optical system focused to the ratio predetermined, the entire rectangular field will be projected at the predetermined size; and
   a lateral limit scale laterally across said copyboard, said scale related to the said range such that a line from said center to a mark on the scale representing the maximum width of the master sheet, and a vertical line from the intersection of said line and said top edge of a selected field size, will delineate the maximum lateral limit of the field which can be projected onto the master.

4. In a system for projecting an image as defined in claim 3. said gauge indicia markings being provided individually by a removable attachment transparent overlay sheet, with gauge means for providing a home position of the sheet with respect to said board when the sheet is installed on the copyboard.

5. In a system for projecting an image as defined in claim 3, said gauge indicia markings being provided individually by optically blind colors, or pigments visible under external radiation stimuli.

6. In a system for projecting an image as defined in claim 3, said gauge indicia markings being provided individually by projecting the markings from a remotely positioned projector.

7. In a system for projecting an image as defined in claim 3, said gauge indicia markings being provided individually by projecting the markings from a remotely positioned projector which has an adjustable lens calibrated for producing a full range of markings with infinite variation within the range.

8. A cooperative system for exposing original material onto a photosensitive master sheet, comprising:

a holder surface for a photosensitive sheet;

a copyboard for acceptance of work to be photocopied;

an optical system for focusing the copyboard surface onto the holder surface, said optical system having a known fixed optical center located on the holder surface and copyboard surface;

means for focusing the optical systems by moving the relative positions of the holder surface, copyboard surface, and lens to produce a range of projected image sizes on said holder;

means for transporting a photosensitive sheet into a predetermined position relative to said optical center; and a plurality of gauge indicia markings on said copyboard related to said optical centers and sheet position such that the distance from a selected mark to the copyboard optical center point is related to the setting of the lens for one selected magnification ratio such that the selected mark on the copyboard indicates a positional relationship of the original material to place the image in registration with the said master sheet.

* * * * *